(12) United States Patent
Komura et al.

(10) Patent No.: US 7,475,430 B2
(45) Date of Patent: Jan. 6, 2009

(54) DATA RECORDING APPARATUS

(75) Inventors: Teruyoshi Komura, Kanagawa (JP); Yasuhiro Takada, Kanagawa (JP)

(73) Assignee: Sony Corporation, Tokyo (JP)

( * ) Notice: Subject to any disclaimer, the term of this patent is extended or adjusted under 35 U.S.C. 154(b) by 788 days.

(21) Appl. No.: 10/613,458

(22) Filed: Jul. 3, 2003

(65) Prior Publication Data

US 2004/0098345 A1    May 20, 2004

(51) Int. Cl.
*H04L 9/32* (2006.01)
(52) U.S. Cl. .................. 726/30; 705/57; 380/201
(58) Field of Classification Search ............ 705/57; 726/30; 380/201
See application file for complete search history.

(56) References Cited

U.S. PATENT DOCUMENTS

| | | | | |
|---|---|---|---|---|
| 5,083,224 A | * | 1/1992 | Hoogendoorn et al. | 360/60 |
| 5,715,403 A | * | 2/1998 | Stefik | 705/44 |
| 5,848,158 A | * | 12/1998 | Saito et al. | 705/54 |
| 5,963,909 A | * | 10/1999 | Warren et al. | 705/1 |
| 6,144,743 A | | 11/2000 | Yamada et al. | |
| 6,519,412 B1 | * | 2/2003 | Kim | 386/94 |

FOREIGN PATENT DOCUMENTS

JP    0 200 074 827 A    3/2002

* cited by examiner

*Primary Examiner*—Andrew L Nalven
(74) *Attorney, Agent, or Firm*—Finnegan, Henderson, Farabow, Garrett & Dunner, L.L.P.

(57) ABSTRACT

A data recording apparatus which enables an individual like an author to record in a recording medium any data, such as a publication desired to be restricted on its copying, in the way that the copying can be restricted in an actually desired condition. A CPU, with respect to the data to be recorded input via an interface unit, compares copy control information input via an interface unit along with data and copy control information separately instructed by an operation panel, and uses the one having a higher restriction level as the copy control information of the data. Then, the CPU converts the input data into a format suitable to recording, generates recording data by adding additional information, such as determined copy control information, and records the same to a desired portion in a recording medium via a recording/reproducing unit.

12 Claims, 5 Drawing Sheets

FIG. 1

| LEVEL | CONDITION | CONTENTS |
|---|---|---|
| 1 | COPY FREE | THE RECORDING MEDIUM OR SOFTWARE MAY BE COPIED FREELY |
| 2 | COPY ONCE | THE RECORDING MEDIUM OR SOFTWARE MAY BE COPIED ONLY ONCE |
| 3 | COPY PROHIBITED | THE RECORDING MEDIUM OR SOFTWARE MAY NOT BE COPIED |

| PC0 | 0 | 1 | 0 | 0 | 0 | 1 |
|-----|---|---|---|---|---|---|
| PC1 | CGMS | | ISR | | SS | |
| PC2 | REC ST | REC END | REC MODE | | | |
| PC3 | DRF | SPEED | | | | |
| PC4 | 1 | GENRE CATEGORY | | | | |

DATA RECORDING APPARATUS

BACKGROUND OF THE INVENTION

1. Field of the Invention

The present invention relates to a data recording apparatus which adds information approving copying, in other words, information regulating copying to any data objected to be recorded for recording to a recording medium, and which is preferably used for video data recording having, for example, visual data and audio data.

2. Description of the Related Art

Due to the recent development of recording techniques, a variety of recording apparatus which is compact but capable of recording a large amount of data and recording medium for actually recording data are being developed.

For example, AV data (audio/visual data), such as TV programs and movies, is mainly recorded to video tapes, compact disks (CD) and digital video disks (DVD), etc. While, game software and the like are often recorded in CDs and floppy disks (FD) although it includes AV data in the same way.

Also, program data to carrying out a desired processing including processing to output AV data and text data, etc. and a variety of data subjected to the processing are mainly recorded in FDs, hard magnetic disks (HD), CDs, magneto-optical disks (MO) and DVDs, etc. because of being processed by computers, etc. Recording media, such as memory cards and IC cards which uses a semiconductor memory as a recording medium, is being developed. As a matter of course, the relationships of the recording data and the recording medium are examples and any medium is capable of recording any data.

As an apparatus for recording desired data in a variety of modes and forms to a variety of media, a video camcorder and video tape recorder (VTR), magnetic disk apparatus are used, for example, in the case of AV data.

The fact that the data can be easily copied can be raised as one of the environmental characteristics of being able to record such a variety of data to a variety of apparatuses by using a variety of data recording apparatus. On the other hand, there is a disadvantage which leads to make copies ignoring copyrights easier of works like AV data, game software, program software and other various data. Especially, when recording data in a digital mode, the data can be copied without deterioration of data at all, as a result, a large number of publications infringing copyrights can be widely spread.

There is a recording format which regulates information on a permission and restriction of copying in formats for recording. However, the fact is that only traders concerned who release such publication (in such a specific format) as their products for sale and some others regulate copying by using such information. Further, it is only by adding such information concerning permission of copying in the recording data by using an apparatus exclusive for producing memory media as products. In other words, in the existing data recording apparatus, such as above video camcorder, a VTR, a magnetic disk apparatus, there have been no such apparatuses capable of recording data in a desired format as taking account of the state of permission and restrictions on copying.

Accordingly, it has been substantially unable, for example, for authors of the publication to record the data of their produced publication to a recording medium in a format of regulating copying by themselves.

SUMMARY OF THE INVENTION

Accordingly, an object of the present invention is to provide a data recording apparatus by which, for example, authors and others can record any data of publication data desired to be put under a copy restriction to a recording medium in an actually desired condition of restricting copying.

Another object of the present invention is to provide a data recording apparatus by which, for example, authors and others can change the data record to be regulated in an actually desired condition to any data already recorded in a recording medium.

To achieve the above objects, the present invention provides a data recording apparatus for recording any data in a recording medium, comprising: a copy permission condition information input means for inputting a copy permission condition information on the data to be recorded; a copy permission condition information read means for reading copy permission condition information of the data recorded in said recording medium, from said recording medium; a copy permission condition information generating means for newly generating new copy permission condition information based on said read copy permission condition information; and a copy permission condition information recording means for recording said newly generated copy permission condition information to the recording medium.

Preferably, the data recording apparatus further comprises a record judging means for judging whether or not said copy permission condition information is recorded on said recording medium and outputting a judgement result and said copy permission condition information recording means generates new copy permission condition information based on said copy permission condition information from said copy permission condition information recording means when it is judged that said copy permission condition information is not recorded on said recording medium.

Further preferably, the data recording apparatus further comprises an input judgement means for judging whether or not said copy permission condition information is input from said copy permission condition information recording means; and said copy permission condition information generating means generates copy permission condition information for permitting a plurality of copies when it is judged that said copy permission condition information is not input by said input judgment means.

Further preferably, the data recording apparatus further comprises a recording means for recording a data to be recorded input means to which said data to be recorded is input and said input data to be recorded on said recording medium and a format conversion means for converting said data to be recorded into a predetermined format, and said data to be recorded is recorded to said recording medium in said predetermined format.

Further preferably the data recording apparatus further comprises a record data generating means for generating said data to be recorded and said recording means records said generated data to be recorded to said recording medium.

Further, to achieve the above objects, the present invention provides a data recording method for recording data to a recording medium, including: a copy permission condition information inputting process for inputting copy permission condition information to data to be recorded; a copy permission condition information reading process for reading copy permission condition information of data recorded in said recording medium, from said recording medium; a copy permission condition information generating process for generating new copy permission condition information based on said input copy permission condition information and said copy permission condition information recorded in said recording medium; and a copy permission condition information recording process for recording newly generated copy permission condition information to the recording medium.

Preferably, the data recording method further includes recording judgement process for judging whether or not said copy permission condition information is recorded on said recording medium and outputting a judgement result, and in said copy permission condition information generating process, new copy permission condition information is generated based on said copy permission condition information from said copy permission condition information input process when it is judged that said copy permission condition information is not recorded in said recording medium by said recording judgement process.

Further preferably, the data recording method further includes input judgement process for judging whether or not said copy permission condition information is input form said copy permission condition information input means, and in said copy permission condition information generating process, copy permission condition information for a plurality of times is generated when it is judged by said input judgement means that said copy permission condition information is not recorded.

Further preferably, said recording medium is recorded thereon said data to be recorded, said copy permission condition information in a predetermined format, and in said copy permission condition information record process, said newly generated copy permission condition information is recorded in a field of copy permission condition information in said format on said recording medium.

Further preferably, the data recording method further includes a recording data input process for inputting said data to be recorded and a recording process for recording said input data to be recorded on said recording medium.

Further preferably, the data recording method further including a recording data generating process for generating said data to be recorded and in said recording process, said generated data to be recorded is recorded on said recording medium.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments of a data recording apparatus of the present invention will be described.

First Embodiment

Data objected to be given a copy restriction (hereinafter, sometimes referred to as a software) can be roughly divided to the software including information of copy control in its format rule determining the data structure of the software and the software not including the information of copy control in its format rule. As a first embodiment of the present invention, a preferable data recording apparatus for giving a copy restriction on the former, that is, the software including the information of a copy control in its format rule determining the data structure of the data, will be explained.

First, copy control information used in a data recording apparatus of the present embodiment will be explained.

The copy control information is the information objected to restrict possible operations of a reproducing/recording apparatus of media and software against copying actions of the recording media and the data recorded therein. There are levels in the copy control information, and when the level gets higher, the tighter restriction is to be imposed on copying actions. When changing the copy control information, it is basically prohibited to change from a higher level to a lower level.

Figure 1:
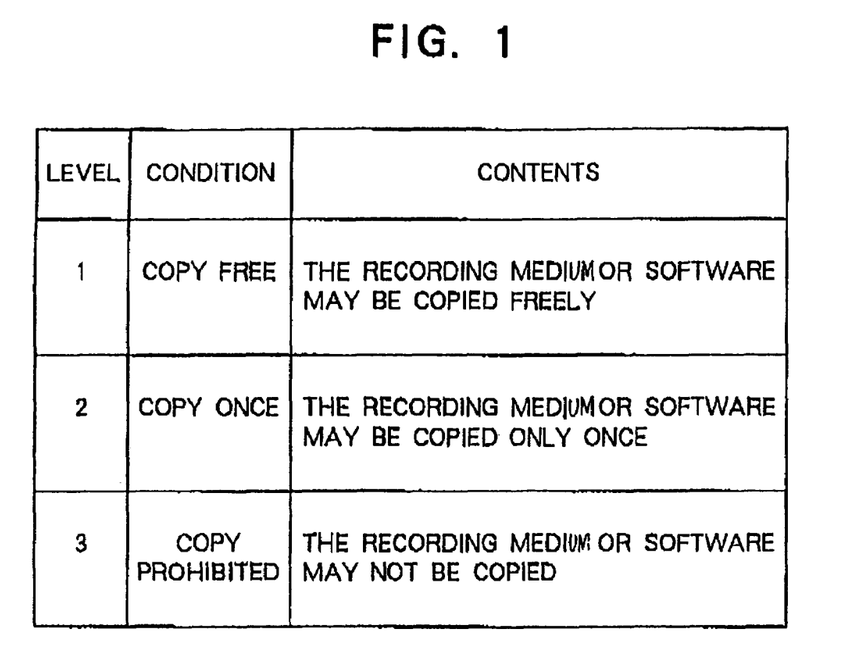
FIG. 1 is a view of an example of levels of information of copy restrictions.

In the present embodiment, levels of three stages shown in FIG. 1 is prescripted.

Namely, level 1 indicates "copy free" which permits to copy recording media or software freely.

Level 2 indicates "copy once" which permits to copy the recording medium or the software only once.

Level 3 indicates "copy prohibited" which prohibits to copy the recording medium or the software.

Next, the configuration of the data recording apparatus of the present embodiment will be explained.

Figure 2:
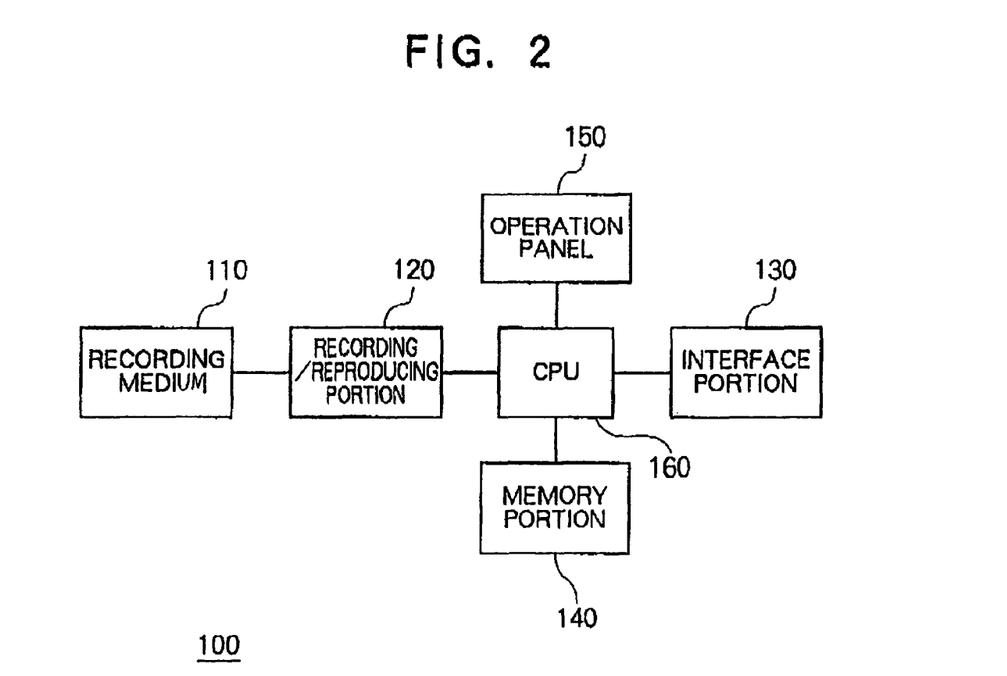
FIG. 2 is a block diagram of the configuration of a data recording apparatus according to a first embodiment of the present invention.

FIG. 2 is a block diagram of the configuration of the data recording apparatus according to the first embodiment.

The data recording apparatus 100 comprises recording medium 110, a recording/reproducing portion 120, an interface portion 130, a memory portion 140, an operation panel 150 and a CPU 160.

The recording medium 110 is a recording medium, such as video tape, to which software is recorded.

The recording/reproducing portion 120 operates recording and reproducing of data on the recording medium 110.

The recording/reproducing portion 120, when instructed by the CPU 160 to carrying out a write operation on the recording medium 110 and to be specified a place to write and data for writing, writes specific data to the specified place on the recording medium 110. Note that the writing data is normally input via the CPU 160.

Also, the recording/reproducing portion 120, when instructed by the CPU 160 to carry out a read operation on the recording medium 110 and the data to read is instructed, reads the instructed data from the recording medium 110 and outputs the instructed data to the CPU 160.

Note that the recording/reproducing portion 120 also reproduces only a predetermined data in the recorded data and updates only the data on the recording medium 110 wherein the data is already stored in accordance with the control by the CPU 160. Recording, updating, reproducing, etc. of the copy permission information according to the present invention are carried out by the function of reproducing and updating only this partial data.

The interface portion 130 carries out an input of software to be recorded, an output of reproduced software, communication of control information with the outside, etc. These input and output operations of software and the communication of control information, etc. are carried out between other portions constituting the apparatus to which the data recording apparatus 100 is applied, or between a further external apparatus thereof.

The memory portion 140 is a memory for storing data of the CPU 160 during an operation and for storing a variety of parameters for the data recording apparatus 100 to carrying out a desired operation.

The operation panel 150 is an operating portion for users like an author to manage the operations on the data recording apparatus 100. Setting of the levels of a copy restriction as shown in FIG. 1 on the software to be recorded or the software already recorded is operated via the operation panel 150.

The CPU 160 controls the respective portions of the data recording apparatus in order that the data recording apparatus 100 carries out a desired operations.

For example, the CPU 160 converts the software to be recorded input via the interface portion 130 to a predetermined format, and generates data for recording based on the parameters and the data set by the operation from the operation panel 150 in accordance with needs and outputs the same to the recording/reproducing portion 120.

Note that at the time of inputting of the software to be recorded via the interface portion 130, when the information of copy restriction is added, the CPU 160 carries out a recording operation of the software based on the information. Namely, when the information indicates the prohibition of copying, the CPU 160 does not record the input software.

Also, the CPU 160 converts the reproduced software input from the recording/reproducing portion 120 in a recording format into data in a predetermined format, and outputs via the interface portion 130. At this time, the CPU 160 adds this information to the data of the software and outputs to the interface portion 130.

Next, an operation of the data recording apparatus 100 will be explained.

Figure 3:
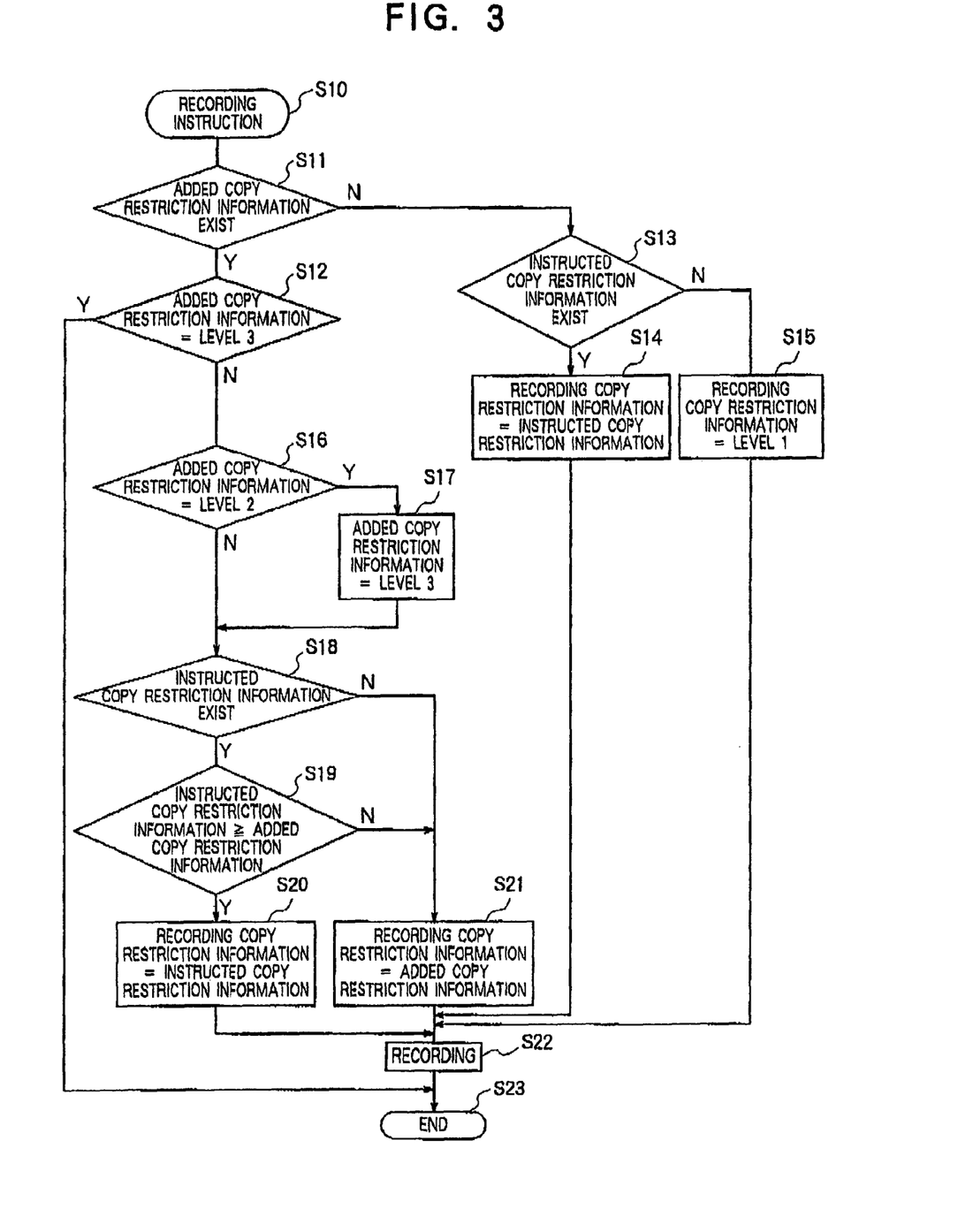
FIG. 3 is a flow chart for explaining an operation of recording input data to a recording medium in the data recording apparatus shown in FIG. 2.

First, the operation of recording a newly input desired software to the recording medium 110 will be explained with reference to the flow chart in FIG. 3.

When an instruction to record data is received (step S10), the CPU 160 checks whether the information of copy restriction is added or not on the software to be recorded which is input via the interface portion 130 (step S11).

When the information of copy restriction is added (step S11) and the restriction level is level 3, namely, copying is prohibited (step S12), recording of the software is not carried out regardless of an operator⊥s operation and stops the recording operation (step S23).

When information of a copy restriction is not added or when the level is 1 or 2 even when the information is added, the recording processing of the software actually starts. First, copy restriction information to be added is determined for that.

The determining method is, when it is judged that the information of copy restriction is not added in the previous step S11, to check whether the information of copy restriction is instructed from the operation panel 150 (step S13). When the information of a copy restriction is instructed, the instructed information of a copy restriction is made to be information of a copy restriction of the data to be recorded (step S14).

While, information of a copy restriction is not instructed from the operation panel 150, the level 1, that is, a condition that copying freely is permitted, is set as the information of a copy restriction of the recording data (step S15).

Furthermore, when information of a copy restriction other than level 3 is added to the input software in the previous steps S11 and S12, whether or not the level is level 2 is inspected (step S16). When it is level 2, it is changed to level 3 (step S17). It is because the level 2 is a condition of "copy once", so that the data recorded by the recording operation this time becomes data of a level 3 which is "copy prohibited".

Then, whether or not the information of copy restriction is instructed by the operation panel 150 is checked (step S18), and when it is instructed, the instructed information of a copy restriction and the input information of a copy restriction which is added to software are compared. Then it is checked that which of the information of a copy restriction is a higher level (step S19). When the instructed information of a copy restriction is a higher level, it becomes the information of a copy restriction of the data to be recorded (step S20).

While, when the information of an added copy restriction is a higher level (step S19), and information of a copy restriction is not instructed by the operation panel 150 (step S18), the information of the added copy restriction is made to be the information of a copy restriction of the data to be recorded (step S21).

When the information of a copy restriction of the data to be recorded is determined in this way in the steps S14, S15, S20 and S21, the recording of the input software is carried out (step S22).

Namely, in the CPU 160, the software to be input is converted to a format suitable to recording and the data for recording is generated by adding additional information, such as determined copy control information, and output to the recording/reproducing portion 120.

The recording data output from the recording/reproducing portion 120 is recorded in the desired position on the recording medium by the recording/reproducing portion 120.

Next, the operation of reproducing the software recorded in the recording medium 110 will be explained.

For example, when the software to be reproduced is instructed via the operation panel 150, the CPU 160 instructs the recording/reproducing portion 120 to reproduce the data.

The recording/reproducing portion 120 accesses to the recording medium 110 based on the instruction, reproduces the instructed data and outputs the same to the CPU 160.

The CPU 160 converts the data from the recording format to a desired format for reproducing output, and outputs via the interface portion 130.

At this time, the CPU 160 extracts the information of a copy restriction from the data in the recording format and outputs the same as additional information along with the reproducing data.

Figure 4:
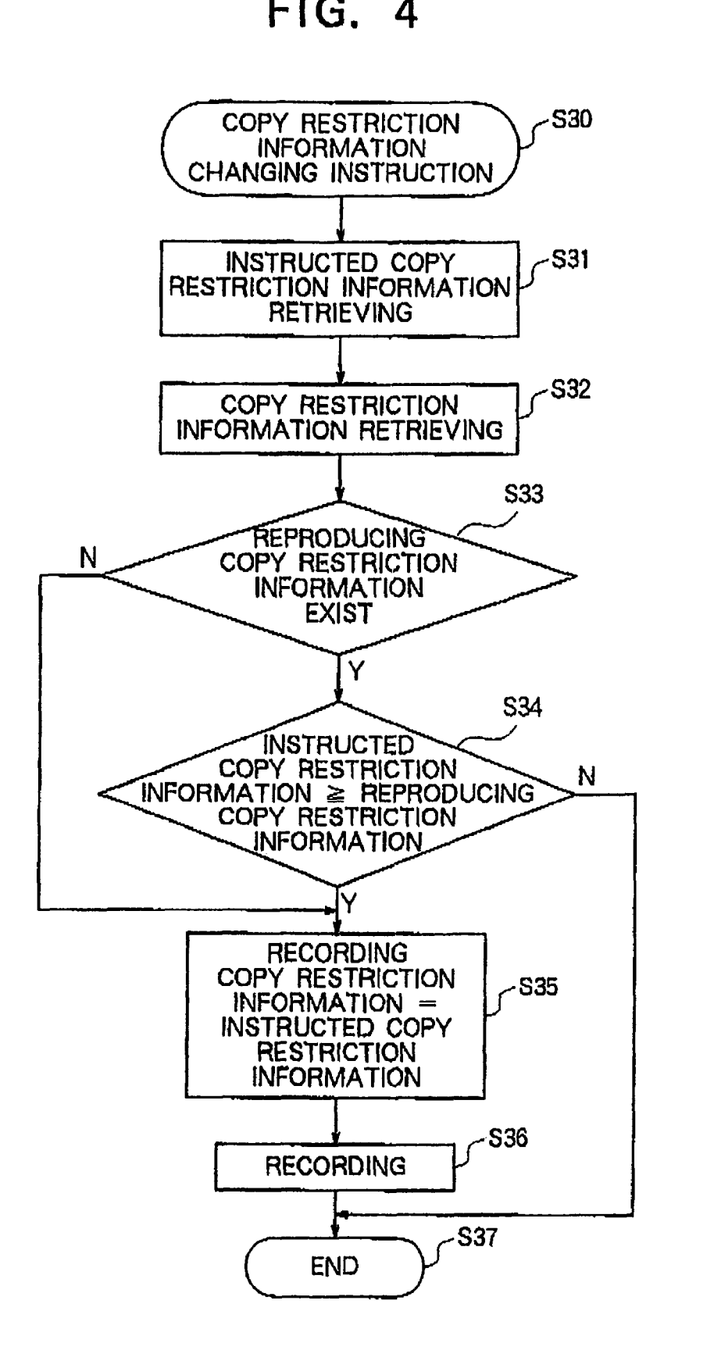
FIG. 4 is a flow chart for explaining an operation of changing information of a copy restriction of data stored in a recording medium in the data recording apparatus shown in FIG. 2.

Next, the operation of changing the information of a copy restriction of the recording medium itself or the data recorded in the recording medium 110 will be explained with reference to the flow chart in FIG. 4.

First, when processing of changing the information of a copy restriction is instructed (step S30), the level of the copy restriction instructed via the operation panel 150 is retrieved (step S31).

Then, in accordance with the instruction from the CPU 160, the recording/reproducing portion 120 accesses a region where the information of the copy restriction of the recording medium 110 itself to be changed of the information of a copy restriction or the data recorded in the recording medium 110 is recorded and reproduces the recorded data (step S32).

The reproducing data is inspected whether or not to be a meaningful suitable data as the information of the copy restriction (step S33), next. When it is not a suitable data, the information of instructed copy restriction is selected as the information of the information of a copy restriction to be changed (step S35) and the information of the copy restriction is actually recorded in the recording medium 110 via the recording/reproducing portion 120 (step S36).

In step S33, when the information of copy restriction reproduced from the recording medium 110 is suitable data, the information of the instructed copy restriction and the information of the copy restriction obtained by the reproduction are compared. It is checked that which of the information of a copy restriction is a higher level (step S34).

When the instructed information of a copy restriction is a higher level, the instructed information of a copy restriction is selected as the information of a copy restriction to be changed (step S35), and the information of the copy restriction is actually recorded to the recording medium 110 (step S36).

While, when the information of the reproduced copy restriction has a higher level, a changing to lower the level of the information of a copy restriction is not carried out, so that the operation of changing the information of a copy restriction is not carried out and the processing for changing the information of a copy restriction ends as it is (step S37).

In this way, in the data recording apparatus 100 of the present embodiment, when software without information of a copy restriction is input, the software can be added information of a copy restriction to be recorded in the recording medium 110. Also, when the information of a copy restriction is already added to the input software, it is possible to add the information of the copy restriction as it is to the software to be recorded on the recording medium 110. It is also possible to change the level of the information of a copy restriction higher and record the software on the recording medium 110.

Also, when the information of a copy restriction is not added to the software recorded in the recording medium 110 or to the recording medium 110 itself, information of a copy restriction can be added. While when the Information of a copy restriction is already added, it is also possible to change the information of a copy restriction to a higher level.

Needless to say, it is also possible to reproduce the data recorded in the recording medium 110 and to output the same along with the added information of a copy restriction.

Second Embodiment

As a second embodiment, a data recording apparatus preferable to impose a copy restriction to the software not including information of a copy restriction in the format rules which determines the data structure of software will be explained.

Figure 5:
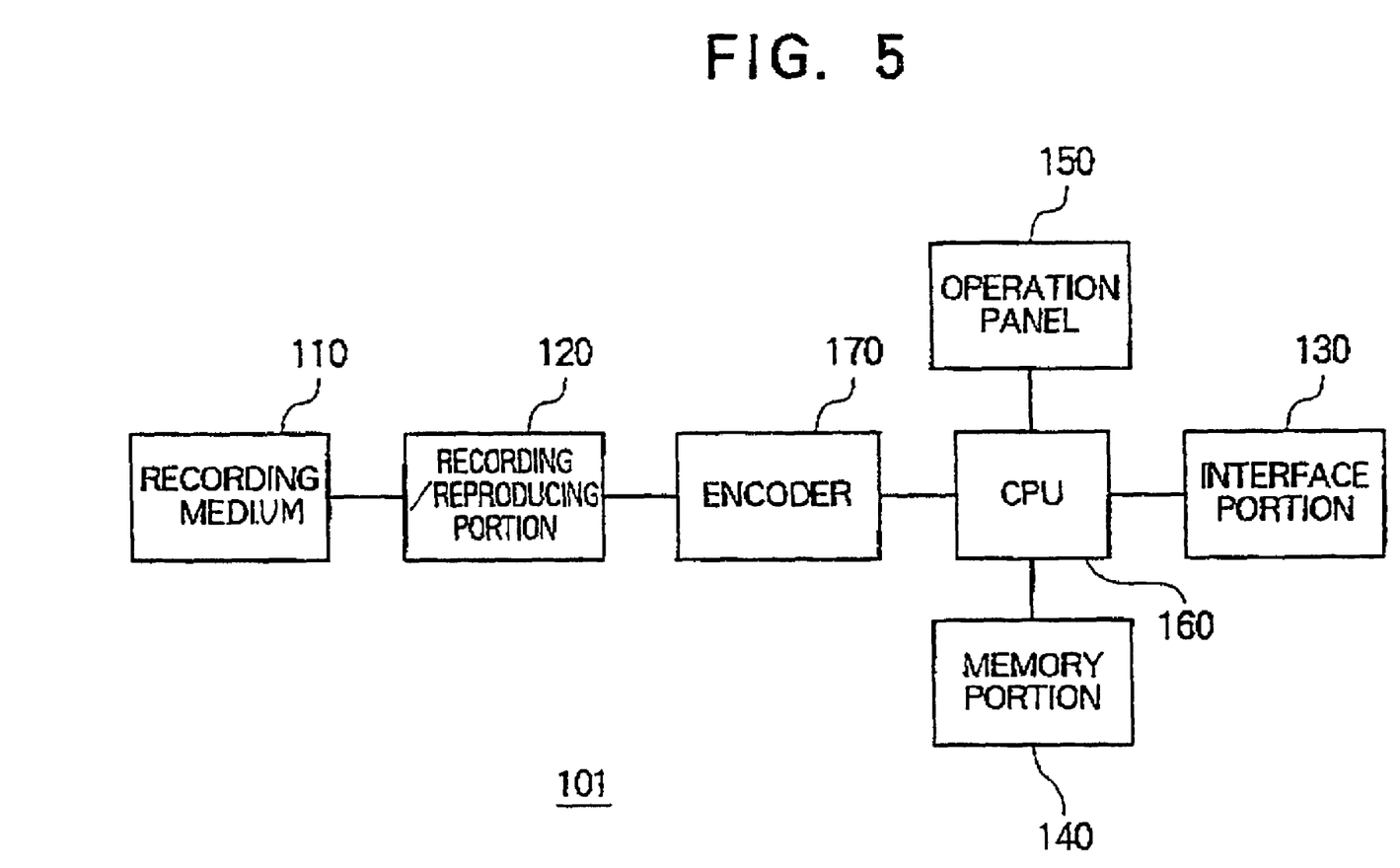
FIG. 5 is a block diagram of the configuration of the data recording apparatus according to a second embodiment of the present invention.

FIG. 5 is a block diagram of the configuration of a data recording apparatus 101 of the second embodiment.

The data recording apparatus 101 comprises recording medium 110, a recording/reproducing portion 120, an encoder 170, an interface portion 180, a memory portion 140, an operation panel 150 and a CPU 160.

Note that the same reference numbers are used for the constituting portions having the same function as those in FIG. 1, and the explanation will be omitted.

As shown in FIG. 5, the data recording apparatus 101 of the second embodiment has the configuration wherein the encoder 170 is provided between the recording/reproducing portion 120 of the data recording apparatus in the first embodiment and the CPU 160.

The encoder 170 adds a certain kind of a signal to the data to be recorded to the recording medium 110 input from the CPU 160 to generate a recording signal. By recording to a video tape a recording signal generated by this function, it is possible to reproduce the tape normally. However, when the reproducing signal is recorded again in an other VCR (when dubbed), the data cannot be reproduced normally. This is the same function as a dubbing prevention function usually used when selling AV soft like movies as products.

In such a data recording apparatus 101, the operation of recording new software on the recording medium 110 will be explained.

First, when being instructed to record data, the CPU 160 checks on the software to be recorded input via the interface portion 130 whether or not a signal indicating a copy restriction is added. The CPU 160 also checks whether or not an instruction indicating to carrying out recording so as to restrict copying is made from the operation panel 150.

As a result, when there is at least either one of the instructions to add a signal indicating a restriction of copying or to instruct to restrict copying, the CPU 160 determines to record the software in a condition unable to be copied.

In this case, the CPU 160 instructs to the encoder 170 to encode the data to be recorded, converts the software to be input in a format suitable to recording and outputs to the encoder 170.

The encoder 170 encodes the signal input from the CPU 160 by adding a predetermined signal as explained above, generates the recording data and outputs the same to the recording/reproducing portion 120. The recording data output to the recording/reproducing portion 120 is recorded in a desired position in the recording medium 110 by the recording/reproducing portion 120.

Next, the operation of reproducing the software recorded in the recording medium 110 will be explained.

Namely, when software to be reproduced is instructed via the operation panel 150, the CPU 160 instructs to the recording/reproducing portion 120 to reproduce the data.

The recording/reproducing portion 120 accesses the recording medium 110 based on the instruction, reproduces the instructed data, and outputs the same to the CPU 160 via the encoder 170. At this time, the encoder 170 does not carry out any meaningful processing but passes the input reproducing data through to output to the CPU 160.

The CPU 160 converts the data form the recording format to a desired format for output to be reproduced and outputs via the interface portion 130.

Note that the reproducing operation is not at all different from the operation of a general reproducing apparatus like a VCR apparatus. However, when the data reproduced in this way is encoded data by the encoder 170 at recording, it cannot be properly reproduced even if the reproducing data is recorded in an external apparatus.

In this way, in the data recording apparatus 101 of the second embodiment, it is possible to record software on the recording medium 110 in the way a copy, able to be properly reproduced, cannot be obtained by the copying action of recording reproduced software.

Accordingly, it is possible, even on software in a form without information of a copy restriction as a format, to record it to have a function of a copy restriction properly.

The data recording apparatus 100 and 101 of the first and second embodiments are adoptable to a variety of actual data recording apparatuses and reproducing apparatuses.

Below, specific examples of the adoption will be explained.

The data recording apparatus 100 of the first embodiment can be applied to a digital video camcorder.

Figure 6:
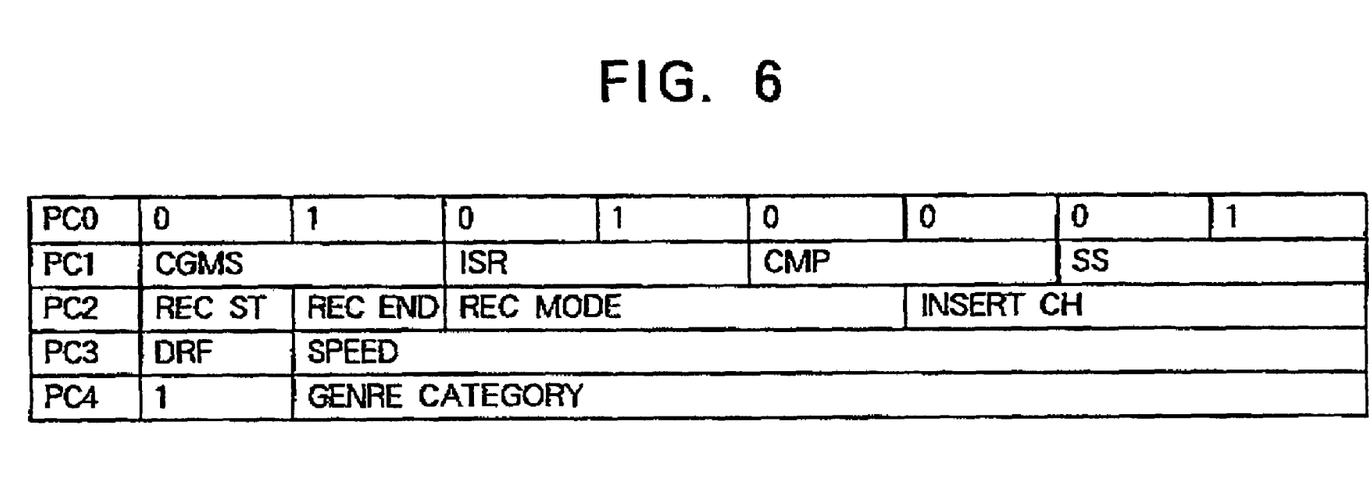
FIG. 6 is a view indicating a recording field of information of a copy restriction in a digital VCR format used in a digital camcorder.

An visual image is recorded in a digital VCR format on a digital video tape. In the digital VCR format, as shown in FIG. 6, there is a field for indicating copy control information in the format. Therefore, by re-writing the copy control information in the digital VCR format, it is possible to adopt a copy restriction to the recorded AV data.

Note that, in FIG. 6, the CGMS field (2 bits) in the byte row is the copy control information. In the byte rows, there is one relating to audio data (included in the AAUX field) and one relating to video data (included in VAUX field), which respectively carrying out a copy control of the audio data and a copy control of the video data.

Users select writing copy control information, for example, as shown in FIG. 1, by using an operation panel belonging to the digital video camcorder.

Then, for example, in a data recording apparatus 100 in the digital video camcorder, re-writing by values corresponding to the copy control information requested by the user is attempted to all of the CGMS field in the AAUX field and the CGMS field in the VAUX field on the tape. At this time, the value of items requested by the user and the value of the copy control information are compared, and the re-writing is carried out when the level of the former value is higher than that of the latter value.

Note that the format in FIG. 6 is described in "Specification of Consumer-Use Digital VCRs".

In the format of VHS recording form, the copy control information is not defined.

However, by adopting the data recording apparatus 101 of the second embodiment and recording on a tape a signal of properly reproducible visual/audio signal subjected to a certain kind of signal processing, the tape can be properly reproduced to enjoy. While, it is possible to record data in the way that a tape on which the reproducing signal is recorded by an other VCR (a dubbed tape) cannot be properly reproduced.

For example, a user prepares a tape desired to be copy controlled and a reproduction VCR for reproducing the tape and sets the tape in the VCR. He/she also connects an output of the reproduction VCR to an input of the data recording apparatus 101.

The user turns on the operation of the encoder portion 170 included in the recording unit and specifies the copy controlling. Then, he/she reproduces the reproduction VCR to start recording by the data recording apparatus 101. As a result, the tape recorded by the data recording apparatus 101, that is, this VHS mode VCR comes to have the copy control as explained above.

It is possible to re-write the copy control information of visual/audio data in the data recorded in a digital video tape in a digital VCR format by connecting a personal computer (PC) to the digital video camcorder based on its control.

As shown in FIG. 6, the digital VCR format has a field indicating the copy control information. Also, some digital video camcorders are provided with an IEEE 1394 terminal. Therefore, by connecting the PC via the IEEE 1394 terminal, the copy control information on the video tape is controlled by an application software operating on the PC.

The user uses the application operating on the PC to select the copy control information to be written as shown in FIG. 1.

The data recording apparatus 101 receives an instruction from the application on the PC via the IEEE 1304 interface to make an attempt to re-write all of the CGMS fields in the AAUX field and CGMS fields in the VAUX field, shown in FIG. 6, on the tape by corresponding values to the items requested by the user. At this time, the data recording apparatus 101 compares the values of items requested by the user with the values of the already written copy control information. And the re-writing is carried out when the level of the former value is higher than that of the latter value.

As explained above, according to the data recording apparatus of the present embodiment, it is possible to provide general consumers with a function of writing the information to restrict copying action on software to recording medium and a function of preparing a recording medium unable to make a properly reproducible copy by a copying action of recording the reproduced software, which are preferable for authors to assert the copyright on the software produced by themselves.

Also, a copy guard becomes possible by a single apparatus for software whose copy control information is not regulated in its format by comprising an encoder in the data recording apparatus. Thus, general users can prepare recording medium with a copy restriction by a simple operation.

Note that the present invention is not limited to the above embodiments and a variety of any preferable modifications are possible. For example, in the data recording apparatus 100 of the first embodiment, between the input copy restriction information and the copy restriction information instructed by the operation panel 150, or between the copy restriction information reproduced by the recording medium 110 and the instructed copy restriction information, the information having the copy restriction information of a higher level is used to be added to the already recorded data or the data to be recorded on the recording medium 110. However, the copy restriction information instructed by the operation panel 150 may be given priority to be used by setting a certain condition. A data recording apparatus having such a configuration is preferable in some cases for having a function of deleting the copy restriction information.

A case where copy control information is recorded for a copy restriction was explained in the data recording apparatus 100 of the first embodiment, and a case where a copy restriction was attained by recording the data in a form copying is impossible was explained in the data recording apparatus 101 of the second embodiment. However, the functions are not limited to be provided separately and the data recording apparatus can be also configured to have both of the functions.

Also, in the data recording apparatus of the second embodiment, the encoder 170 was implemented by an exclusive component, however, it may be operated as an application on the CPU 160, as well.

Other components, memory medium, data to be recorded, a main apparatus to which the data recording apparatus is applied, etc. may be any components.

As explained above, according to the data recording apparatus of the present invention, it is possible, for example, for an author to record any data, such as the data of a publication desired to be restricted on copying, can be recorded in the way to restrict copying in an actually desired condition. Also, it is possible to change the recording condition of the data in the way that the copying of the data can be restricted in a desired condition on any data already recorded on a recording medium.

As a result, it is possible to appropriately control copying on the data in a recording medium and a copyright protection having a substantial compulsion can be attained. Also, it enables a variety of apparatuses capable of carrying out a restriction on copying to become widespread, and enables to attain a copyright protection on a publication produced at a personal level.

While the invention has been described with reference to specific embodiment chosen for purpose of illustration, it should be apparent that numerous modifications could be made thereto by those skilled in the art without departing from the basic concept and scope of the invention.

What is claimed is:

1. A method for controlling copying of data in a recording apparatus, the method comprising the steps of:

inputting the data to be recorded onto a recording medium;

converting the input data into a predetermined format which is reproducible in the recording apparatus;

determining whether the input data includes information for controlling copying of the data;

if the input data does not include the information for controlling copying, then adding copying permission information to the converted data;

if the input data includes the information for controlling copying, then:

extracting the information for controlling copying included in the input data;

receiving, via an operational panel, a copy restriction level from a user;

comparing a copy restriction level indicated by the information for controlling copying with the copy restriction level;

generating the copy permission information in accordance with the comparing, the copy permission information specifying a type of copy permission to be associated with the data; and adding the copy permission information to the converted data; and recording the converted data with the copy permission information onto the recording medium.

2. The method according to claim 1, further comprising the step of reproducing the converted data recorded on the recording medium loaded on the recording apparatus.

3. The method according to claim 1, further comprising the steps of:

reading the converted data recorded on the recording medium;

extracting the copy permission information from the converted data recorded on the recording medium;

generating information for controlling copying of the converted data to be output in accordance with the type of copy permission specified by the copy permission information; and outputting the converted data along with the generated information for controlling copying of the converted data.

4. The method according to claim 1, further comprising the step of transforming the data into a form which cannot be reproduced when copied onto other recording medium.

5. The method according to claim 1, further comprising the step of determining whether copy protection of the converted data to be recorded is instructed by a user of the recording apparatus, and wherein the copy permission information is generated and added to the converted data if copy protection of the converted data to be recorded is instructed.

6. A recording apparatus comprising:

an operation panel which receives a copy restriction level from a user;

an inputting device which inputs data to be recorded onto a recording medium;

a converting device which converts the input data into a predetermined format which is reproducible in the recording apparatus;

a determining device which determines whether the input data includes information for controlling copying of the data;

an extracting device which extracts the information for controlling copying included in the input data;

a comparing device which compares a copy restriction level indicated by the information for controlling with the copy restriction level;

a generating device which generates copy permission information in accordance with an output of the comparing device, the copy permission information specifying a type of copy permission to associate with the data;

an adding device which adds the copy permission information to the converted data; and a recording device which records the converted data with the copy permission information onto the recording medium.

7. The apparatus according to claim 6, further comprising a reproducing device which reproduces the converted data recorded on the recording medium loaded on the recording apparatus.

8. The apparatus according to claim 6, further comprising:

a reading device which reads the converted data recorded on the recording medium;

an information extracting device which extracts the copy permission information from the converted data recorded on the recording medium;

an information generating device which generates information for controlling copying of the converted data to be output in accordance with the type of copy permission specified by the copy permission information; and an outputting device which outputs the converted data along with the generated information for controlling copying of the converted data.

9. The apparatus according to claim 6, further comprising a transforming device which transforms the data into a form which cannot be reproduced when copied onto other recording medium.

10. The apparatus according to claim 6, further comprising an instruction determining device which determines whether copy protection of the converted data to be recorded is instructed by a user of the recording apparatus, and wherein the copy permission information is generated and added to the converted data if copy protection of the converted data to be recorded is instructed.

11. A method for controlling copying of data in a recording apparatus, the method comprising the steps of:

inputting the data to be recorded onto a recording medium;

determining whether the input data is associated with information for controlling copying of the data;

extracting the information for controlling copying upon determining that the input data is associated with the information for controlling copying;

detecting a copy restriction level of the data via an operation panel operated by a user;

comparing a copy restriction level of the information for controlling copying with the copy restriction level;

generating copy permission in accordance with the comparing, the copy permission information being determined by selecting a strict copy level; and adding the copy permission information to the data;

recording the data with the copy permission information onto the recording medium.

12. A recording apparatus comprising:

an operation panel which receives a copy restriction level from a user;

an inputting device which inputs data to be recorded onto a recording medium;

a determining device which determines whether the input data is associated with information for controlling copying of the data;

an extracting device which extracts the information for controlling copying upon determining that the input data is associated with the information for controlling copying;

a comparing device which compares a copy restriction level of the information for controlling copying with the copy restriction level;

a generating device which generates copy permission in accordance with an output of the comparing device, the copy permission information being determined by selecting a strict copy level; and an adding device which adds the copy permission information to the data; and a recording device which records the data with the copy permission information onto the recording medium.

* * * * *